Sept. 13, 1966          J. D. CARPENTER                3,272,992
       STAR TRACKER SIGNAL CONDITIONER OF AMPLITUDE, FREQUENCY, SLOPE
                                AND WIDTH
Filed June 28, 1963                                3 Sheets-Sheet 1
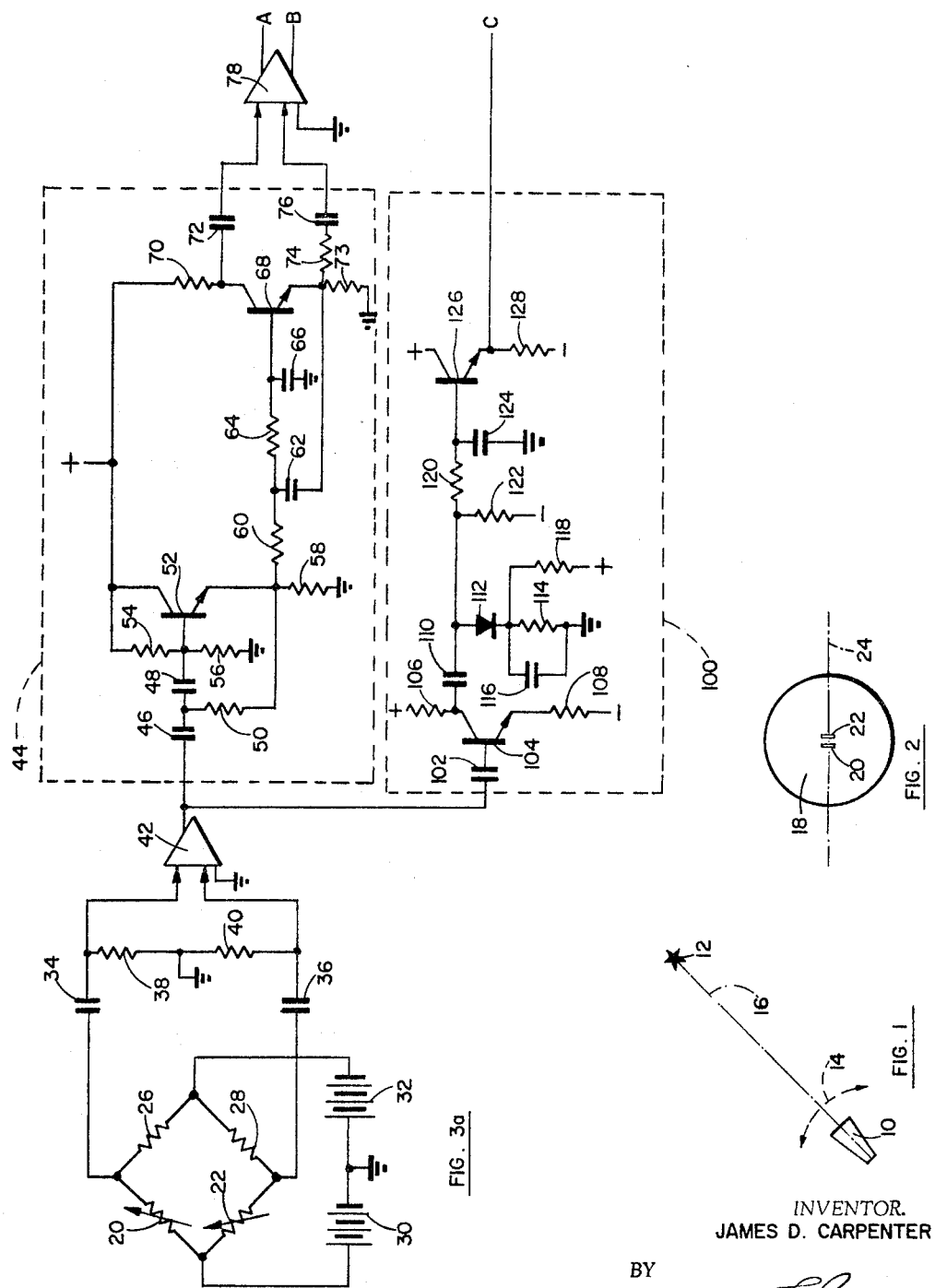
INVENTOR.
JAMES D. CARPENTER
BY
*Ernest L. Brown*
ATTORNEY

INVENTOR.
JAMES D. CARPENTER

BY Ernest L. Brown

ATTORNEY

United States Patent Office 3,272,992
Patented Sept. 13, 1966

3,272,992
STAR TRACKER SIGNAL CONDITIONER OF AMPLITUDE, FREQUENCY, SLOPE AND WIDTH
James D. Carpenter, Long Beach, Calif., assignor to North American Aviation, Inc.
Filed June 28, 1963, Ser. No. 291,557
9 Claims. (Cl. 307—88.5)

This invention pertains to an electronic means for identifying the presence of two consecutive oppositely poled pulses having predetermined slopes and spacing and more particularly to means for identifying such a pulse sequence in an automatic star tracking telescope.

In one preferred embodiment of the device described in co-pending patent application Serial No. 289,122 by Horace A. Beall, Jr., entitled, "Star Tracker," a pair of cadmium sulfide photosensitive resistors are deposited on a ceramic substrate in the form of two parallel strip surfaces whose parallel direction is perpendicular to a predetermined trajectory on the focal plane of a telescope. Two pairs of cadmium sulfide photoelectric cells may be placed in the focal plane of a gimbaled telescope with each pair of cells having their parallel directions oriented such that motion of the telescope about one predetermined axis causes the sky image viewed by the telescope to sweep across that pair in a direction perpendicular to the parallel orientation of that pair of photosensitive surfaces. The telescope may then be consecutively dithered about each axis to cause the image of a preselected start to be swept consecutively across each pair of photosensitive surfaces. Because the electronics associated with each pair is substantially identical, only one set of electronics is described herein.

In one embodiment of this invention both photoelectric resistors of one pair of photosensitive surfaces is connected to form two branches of a bridge circuit. As the telescope is dithered, the image of a star in the field of view of the telescope usually crosses both cells during one direction of sweep then recrosses both cells in reverse order during the reverse order of sweep.

The amplified signal which is generated at the output of the bridge contains a pair of signal pulses of opposite polarity, which have a shape, a pulse width, and a spacing that is a function of the size and spacing of the cells, the focal length of the telescope, and the angular velocity of the telescope during the dither. In addition to the spaced apart pulses, a substantial amount of undesired signal or noise is present.

To condition the signal to sense the presence of a star in the field of view of the telescope or, in the broader aspect of the invention, to sense a pair of oppositely poled spaced-apart pulses of predetermined spacing and slope in the presence of noise, the signal is filtered to remove noise of frequencies above and below the frequencies expected in the desired signal. The signal is then base-clipped and shaped to present two rectangular pulses each of whose width is substantially equal to the width of pulses of the desired signal and which are spaced apart by a distance which is substantially equal to the spacing apart of the pulses of the desired signal.

Additional circuitry is connected to the output of the clipper and shaper to insure that only signals which have the proper polarity sequence, the desired pulse duration, and the desired pulse separation, are channeled through the circuitry to generate a pulse which is both an indication of the presence of a star image in the field of view of the telescope or, in the broader aspect of this invention, an indication of the presence of the signal of known pulse width, pulse separation, and pulse shape. Means are also provided for sensing the slope of the signal before it is clipped and for inhibiting the output signal if the slope magnitude is below a predetermined value which is characteristic of the desired signal. The signal is then a "pip" or "spike" whose timing is a measure of the off-set of the star image from the predetermined position of a preselected star image in the field of view of the telescope.

It is therefore an object of this invention to generate an electrical signal which is an indication of the presence of a received signal which contains pulses of a predetermined pulse width and polarity, a predetermined polarity sequence, a predetermined slope magnitude, and a predetermined pulse separation.

It is another object of this invention to detect the presence of a star signal.

It is another object of this invention to sense the presence of a signal which has two separated pulses of opposite polarity in a predetermined pulse sequence, which has a slope above a predetermined minimum at the beginning of the first pulse in the sequence, which has pulses greater than a predetermined minimum width, and which has a pulse separation which is less than a predetermined amount.

It is a more particular object of this invention to provide electronic apparatus which is adapted to achieve the above enumerated objects.

Other objects will become apparent from the following description taken in connection with the accompanying drawings in which:

FIGURE 1 is a schematic diagram of a telescope, the line of sight to a star, and a typical dither motion of the telescope;

FIGURE 2 is a plan view of a typical pair of spaced-apart parallel photoelectric surfaces whose parallel directions are perpendicular to the direction of dither of a supporting telescope; and FIGURES 3a, 3b, and 3c combine to display a typical detailed schematic diagram of a circuit of this invention.

Figure 3B:
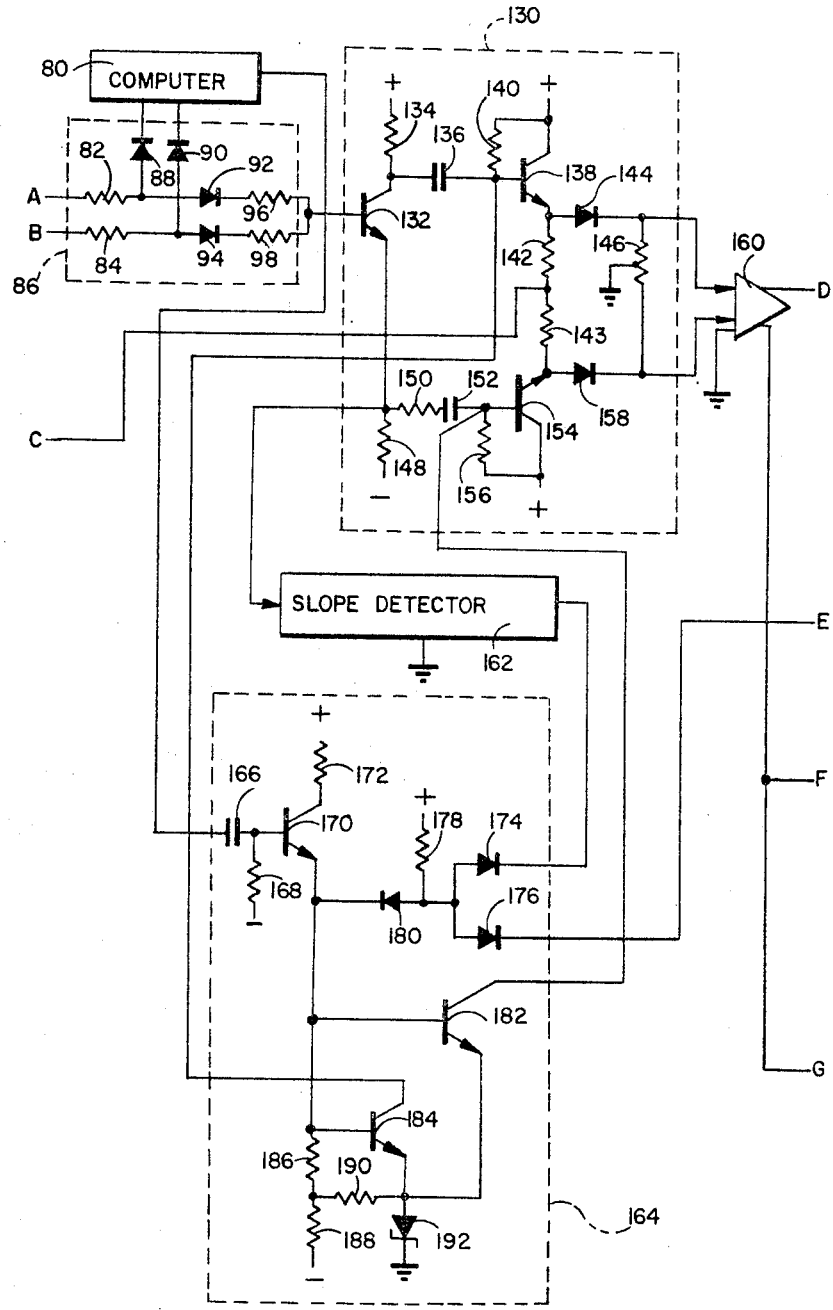

As shown in FIGURE 1, a telescope 10 is pointed in a predetermined direction to place the optical axis 16 of the telescope substantially in line with the light from a distant star 12. The telescope is then rocked or dithered over a small angle as indicated by the dashed arrows 14.

In FIGURE 2 the focal plane of telescope 10 is a pair of photoelectric resistors 20 and 22 which have substantially parallel sides which are perpendicular to the dither motion 24 of the telescope. Photosensitive surfaces 20 and 22 are mounted, for example, on a ceramic substrate 18 as set forth in co-pending patent application, Serial No. 289,122 by Horace A. Beall, Jr., entitled, "Star Tracker."

In FIGURE 3a a typical circuit photosensitive resistors 20 and 22 are connected with resistors 26 and 28 into a Wheatstone bridge which is energized by voltage sources 30 and 32. The output terminals of the Wheatstone bridge are capacitively coupled through capacitors 34 and 36 across resistors 38 and 40 to the input terminals of a differential amplifier 42.

The output of differential amplifier 42 is connected to the input of a filter network 44. The input terminal of filter network 44 is connected through series condensers 46 and 48 to the base of NPN transistor 52. Resistors 50 and 58 are connected in series between tthe junction of condensers 46 and 48 and the ground terminal. Resistor 56 is connected between the base of transistor 52 and the ground terminal. Resistor 54 is connected between the collector and base of transistor 52. The emitter of transistor 52 is connected to the junction between resistor 50 and 58 and is connected through the series connected resistors 60 and 64 to the base of NPN transistor 68. The collector of transistor 52 is connected to a source of positive voltage (not shown). Condenser 62 is connected between the junction of resistors 60 and 64 and the emitter of transistor 68. Condenser 66 is connected between the base of transistor 68 and the ground terminal. The collector of transistor 68 is connected through resistor 70 to a source of positive voltage (not shown). The emitter of transistor 68 is connected through resistor 73 to ground. One output terminal of filter 44 is connected through capacitor 72 to the collector of transistor 68. The other output terminal of filter 44 is connected through series connected condenser 76 and resistor 74 to the emitter of transistor 68.

The output terminals of filter 44 is connected to a differential amplifier 78.

Referring to FIGURE 3b, computer 80 generates commands to telescope 10 which causes a movement or dithering of the telescope and star image, i.e., from left to right, or from right to left along line 24 of FIGURE 2. When the telescope dithers in a first direction, a signal is applied to the cathode of diode 88 of a star pulse polarity circuit 86. When the telescope moves in a second direction a signal is applied to the cathode of diode 90 of star pulse polarity control 86. One output of one polarity of differential amplifier 78 is connected in series with resistor 82, diode 92 and resistor 96 to the base of transistor 132. A second output of a second polarity of differential amplifier 78 is connected in series through resistor 84, diode 94 and resistor 98 to the base of transistor 132. The anode of diode 88 is connected to the anode of diode 92, and the anode of diode 90 is connected to the anode of diode 94.

A base-clipper 130 is adapted, when it is not blocked, to clip the base of the signal applied to the base of transistor 132. The input terminal of base clipper 130 is connected to the base of NPN transistor 132. The collector of transistor 132 is connected through a resistor 134 to a source of positive voltage (not shown). The collector of transistor 132 is capacitively coupled through capacitor 136 across resistor 140 to the base of NPN transistor 138. The emitter of transistor 132 is connected through resistor 148 to a source of negative voltage (not shown) and to the input terminal of slope detector 162. The emitter of transistor 132 is also connected in series with resistor 150 and capacitor 152 to the base of NPN transmitter 154. The collector of transistor 138 is connected to a source of positive voltage (not shown). Resistor 140 is connected between the collector and base of transistor 138. The collector of transistor 154 is connected to a source of positive voltage (not shown). Resistor 156 is connected between the collector and base of transistor 154. The emitters of transistors 138 and 154 are connected across the series-connected resistors 142 and 143. The emitter of transistor 138 is connected through diode 144 to a first output terminal of base clipper 130. The emitter of transistor 154 is connected through diode 158 to a second output terminal of base clipper 130. Resistor 146, whose center tap is connected to the ground terminal, is connected across the output terminals of base clipper 130. The output terminals of base clipper 130 are connected to the input terminals of peak clipper differential amplifier 160. The center tap between resistors 142 and 143 is connected to the output terminal of a base clipping bias source 100. The bases of transistors 138 and 154 are connected to the collectors of NPN transistors 184 and 182 of a grounding circuit 164.

The base clipping biasing circuit 100 may be a circuit whose output voltage is a measure of the root mean square of its input voltage. The shown circuit 100 is such a circuit. Circuit 100 is substantially a rectifier and filter circuit. The input terminal of circuit 100 is connected to the output terminal of differential amplifier 42. The input terminal of circuit 100 is connected through a condenser 102 to the base of NPN transistor 104. The emitter of transistor 104 is connected through a resistor 108 to a source of negative voltage (not shown). The collector of transistor 104 is connected through resistor 106 to a source of positive voltage (not shown), and through capacitor 110 in series with resistor 120 to the base of NPN transistor 126. The junction between condenser 110 and resistor 120 is connected through resistor 122 to a source of negative voltage (not shown) and through the series connection of diode 112 and resistor 118 to a source of positive voltage (not shown). The junction between diode 112 and resistor 118 is connected through the parallel combination of resistor 114 and condenser 116 to the ground terminal. The base of transistor 126 is connected through condenser 124 to the ground terminal. The collector of transmitter 126 is connected to a source of positive voltage (not shown). The emitter of transistor 126 is connected to the output terminal of circuit 100 and, through resistor 128, to a source of negative voltage (not shown).

The grounding circuit 164 includes two NPN transistors 182 and 184 whose collectors are connected to the bases of transistors 138 and 154 to impede the flow of signals through base clipper 130 under certain circumstances and to allow signals to pass through clipper 130 under other circumstances. The slope detector 162 is connected through back-to-back series connected diodes 174 and 180 (i.e., two like electrodes of diodes 174 and 180 are connected together) to the bases of NPN transistors 182 and 184. The junction between diodes 174 and 180 is connected through resistor 178 to a source of positive voltage (not shown). A holding voltage is received, at the terminal attached to the cathode of diode 176, from pulse width modifier 222. The anode of diode 176 is connected to the anode of diode 174. To prevent switching transients during the change of direction of telescope 10 from opening the grounding circuit 164, computer 80 channels a signal to capacitor 166 at the time of switching. Capacitor 166 is series connected between the computer 80 and the base of NPN transistor 170. Resistor 168 is connected between the base of transistor 170 and a source of negative voltage (not shown). The bases of transistors 182 and 184 are connected of transistor 170 and a source of positive voltage (not shown). The base of transistors 182 and 184 are connected through series connected resistors 186 and 188 to a source of negative voltage (not shown). Resistor 190 is connected between tthe junction of resistors 186 and 188 and the emitter of transistors 182 and 184. The emitters of transistors 182 and 184 are connected together in series with a diode 192 to the ground terminal.

The output signals from peak clipper differential amplifier 160 are rectangular signals which are of opposite polarity. A signal of a first polarity is connected to the input terminal of a minimum pulse width control circuit 194.

Minimum pulse width control circuit 194 is, in the shown circuit, a rectangular wave generator which has a time constant that is equal to the minimum allowable time between the leading edge of the first pulse of a desired pulse sequence and the trailing edge of the last pulse of a desired pulse sequence. The input terminal of minimum pulse width control circuit 194 is connected through a pair of back-to-back series-connected diodes 196 and 212 to the base of NPN transistor 214. The junction between diodes 196 and 212 connects two like electrodes and is connected through a resistor 200 and a condensor 210 to a source of negative voltage (not shown). The junction between diodes 196 and 212 is connected through resistor 197 to the moveable arm of a potentiometer 198 which is connected between a source of positive voltage (not shown) and a ground terminal. The collector of transistor 214 is connected through a resistor 216 to a source of positive voltage (not shown). The emitter of transistor 214 is connected through diode 218 to the ground terminal and is connected through resistor 220 to a source of negative voltage (not shown).

Pulse width controller 222 is a monostable multivibrator whose natural period is greater than the time between the leading edge of the first of a desired pulse pair and the trailing edge of said pulse pair. Additional circuitry is shown in controller 222 to return the signal at the output of circuit 222 to zero when the trailing edge of the last pulse of an allowed pulse pair is detected. The input terminal of circuit 222 is connected to the second polarity output of differential amplifier 160. The input terminal of circuit 222 which is connected to amplifier 160 includes a differentiating circuit of a series condenser 224, connected to the base of NPN transistor 232, and a resistor 226 connected between the base of transistor 232 and the ground terminal. The emitter of transistor 232 is connected to the ground terminal. A resistor 234 is connected between the emitter and collector of transistor 232. A diode 228 is connected between the collector of transistor 232 and the collector of NPN transistor 250. The collector of transistor 250 is the output terminal of circuit 222. The output terminal of circuit 222 is connected to diode 176 of grounding circuit 164 and is connected to diode 292 of generator 276. The collector of transistor 250 is connected through condenser 230 to the base of transistor 240. The base of transistor 240 is connected through resistor 239 to the moveable arm of a potentiometer 241. Potentiometer 241 is connected between a source of positive voltage (not shown) and a ground terminal. The collector of NPN transistor 240 is connected through resistor 242 to a source of positive voltage (not shown). The collector of transistor 240 is connected through diode 236 to the collector of transistor 232. The collector of transistor 240 is connected through the parallel combination of condenser 244 and resistor 246 to the base of transistor 250. The emitter of transistor 250 is connected to the ground terminal. A resistor 248 is connected between the emitter and base of transistor 250. The collector of transistor 250 is connected through resistor 252 to a source of positive voltage (not show).

A rectangular wave generator 254 is connected to be triggered by means of the second output of differential amplifier 160. The time constant of multivibrator 254 is adjusted so that an output signal from circuit 314, indicating the presence of a star pulse will not be generated unless the second pulse of the oppositely poled pulse group is present. The input terminal of circuit 254 is a diode 256 which is connected in series with diode 262 to the base of transistor 268. Two like terminals of diodes 256 and 262 are connected together. The junction between diodes 256 and 262 is connected through resistor 260 to the moveable arm of potentiometer 258 which is connected between a source of positive voltage (not shown) and the ground terminal. The junction between diodes 256 and 262 is connected through the series connection of resistor 264 and condenser 266 to a source of negative voltage (not shown). The output terminal of the generator 254 is on the collector of transistor 268 which is connected through the resistor 270 to a source of positive voltage (not shown). The emitter of transistor 268 is connected through diode 272 to the ground terminal and through resistor 274 to a source of negative voltage (not shown).

A modified monostable multivibrator 276 which is substantially identical shown to that described in patent application No. 843,534 filed September 30, 1959 for a "Timing Pulse Generator" by William D. Ashcraft, is adapted to generate a pulse which is longer by a predetermined preset time delay than the time between the leading edge of the first pulse and the trailing edge of the last pulse of a desired signal pulse pair. The input terminal of circuit 276 is connected between the collector of transistor 214 and condenser 280. The input terminal of circuit 276 is connected through the series combination of condenser 280 and diode 278 to the base of NPN transistor 284. The junction of diode 278 and condenser 280 is connected to ground through resistor 282. The base of transistor 284 is connected to the collector of transistor 306. The collector of transistor 284 is connected through a diode 286 and a resistor 288 to a source of positive voltage (not shown). The collector of transistor 284 is connected through diode 310 to the output terminal of circuit 276. The output terminal of circuit 276 is connected through resistor 312 to a source of positive voltage (not shown). The emitter of transistor 284 is connected to the ground terminal. The junction between resistor 288 and diode 286 is connected through condenser 290 and diode 302 to the base of NPN transistor 306. The collector of transistor 306 is connected through resistor 308 to a source of positive voltage (not shown). A resistor 304 is connected between the base and emitter of transistor 306. The emitter of transistor 306 is connected to the ground terminal. The junction between condenser 290 and diode 302 is connected through resistor 298 to the moveable arm of potentiometer 300 which is connected between a source of positive voltage (not shown) and the ground terminal. The series combination of diode 294 and resistor 296 is connected in parallel with resistor 298. The junction between diode 294 and resistor 296 is connected to diode 292. Like electrodes of diodes 292 and 294 are connected together. Diode 292 is connected to receive signals from the collector of transistor 250.

Circuit 314 is adapted to generate a pulse at the trailing edge of the pulse received from circuit 276. The input terminal from diode 310 of circuit 276 is connected to condenser 316. Condenser 316 is connected in series with diode 324 to the base of NPN transistor 330. The junction between condenser 316 and diode 324 is connected through resistor 322 to a source of positive voltage (not shown). The junction between condenser 316 and diode 324 is connected to diodes 318 and 320. One of the like electrodes of each of diodes 318, 320, and 324 are connected together. The base of transistor 330 is connected through diode 328 to the ground terminal and through resistor 326 to a source of negative voltage (not shown). The emitter of transistor 330 is connected through diode 334 to the output of circuit 194. The collector of transistor 330 is connected through a resistor 332 to a source of positive voltage (not shown), and to an output terminal through the series combination of condenser 336 and resistor 338.

It is obvious that if each diode is reversed, each voltage polarity is reversed, and PNP transistors are substituted for the NPN transistors, the circuit still operates properly.

In operation, the telescope 10 is pointed in a known direction relative to its supporting structure and substantially with its line of sight 16 in the direction of a preselected star. By means which are not part of this invention, telescope 10 is rocked slightly about a predetermined axis to cause the field of view of telescope 10 to move as shown by line 24 in FIGURE 2 across a pair of substantially parallel spaced-apart photosensitive resistors 20 and 22.

When a star image (which is a point of light) consecutively intercepts photosensitive first resistor 20 then resistor 22, or consecutively intercepts first photosensitive resistor 22 then photosensitive resistor 20, a signal is generated at the output of amplifier 42 which contains first a positive and then a negative pulse of predetermined pulse width and pulse spacing or first a negative then a positive pulse of predetermined pulse width and pulse spacing. Whether a positive pulse or a negative pulse appears first depends upon the direction of motion of telescope 10 at the time of interception of photosensitive resistors 20 and 22. In addition to the star signal, a considerable amount of noise is generated. However, the frequency distribution of the signal is different from that of the noise. Thus, the signal appearing at the output of amplifier 42 contains both the desired signal and a considerable amount of noise.

The signal at the output of differential amplifier 42 is rectified and filtered to provide a biasing voltage at the emitter of transistor 126. The voltage at the emitter of transistor 126 is substantially equal to the root means square of voltage appearing at the output of amplifier 42.

The voltage or signal appearing at the output of amplifier 42 is also channeled through a band pass filter 44. Filter 44 is adapted to pass frequencies which are within a band which characterizes the desired signal but rejects frequencies which are both above and below that band. The output of filter 44 is amplified by amplifier 78 to generate two oppositely poled outputs.

Figure 3C:
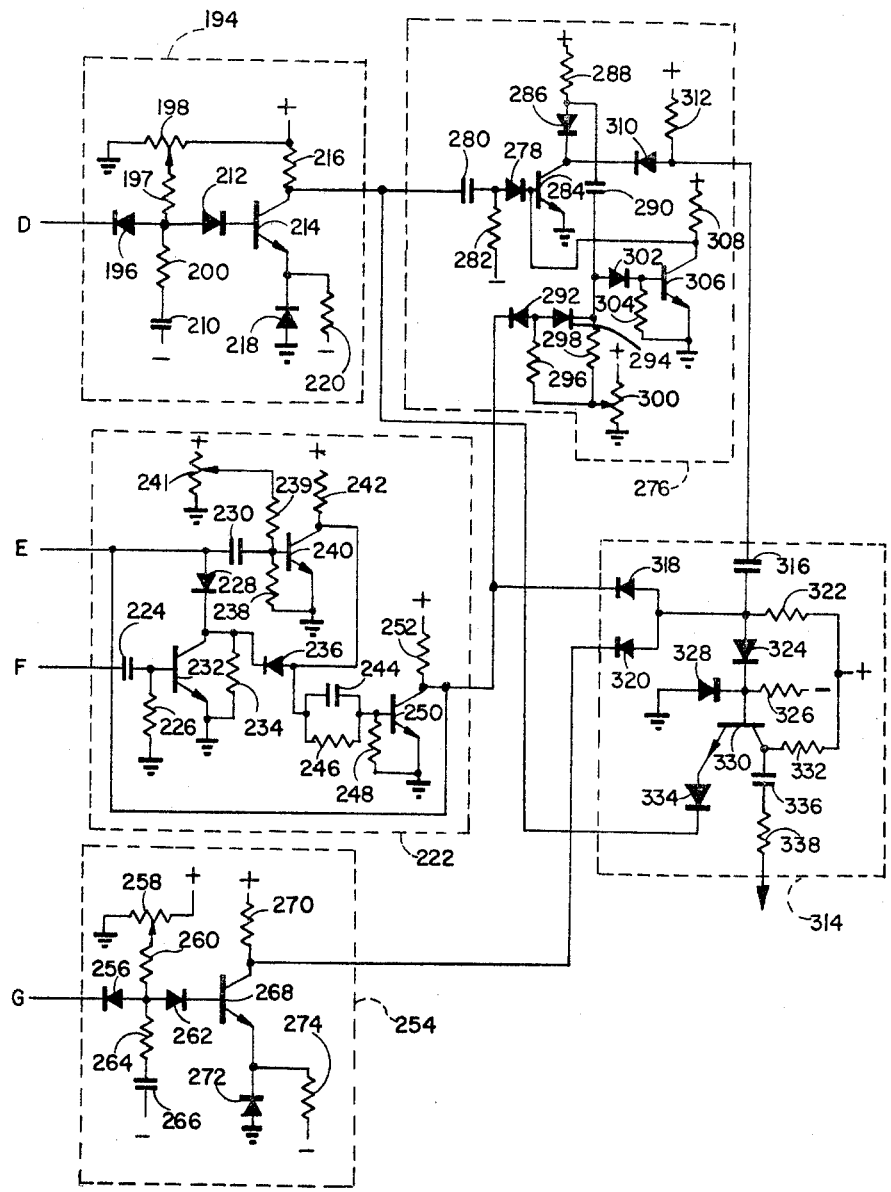

It is desired that only one predetermined sequence of signals be used. For example, with the circuit shown in FIGURE 3 only a sequence which has the positive pulse followed by the negative pulse will generate an output signal at the output of circuit 314. It is apparent that whether a signal which has a positive and then a negative pulse or signal which has a negative and then a positive pulse appears at the output of amplifier 42 depends upon the direction of travel of telescope 10 and of the star signal along trajectory 24. Computer 80, which is not part of this invention, is adapted to control the motion of telescope 10 during the dithering or oscillation thereof. Computer 80 also is adapted to generate control signals at the cathodes of diodes 88 or 90 to cause only the pulse sequence in which the positive pulse comes first to be applied to the base of transistor 132.

The voltage at the emitter of transistor 126 which is applied to the junction between resistors 142 and 143 establishes the base clipping level of the base clipper 130. All signals appearing at the base of transistor 132 which exceed the value established by the voltage at the emitter of transistor 126 are amplified and shaped into square waves which appear at the output of the differential amplifier 160, provided the bases of transistors 138 and 154 are not grounded by grounding circuit 164.

Grounding circuit 164 customarily shorts the input signals to transistors 138 and 154 so that no output appears across resistor 146. When the voltage appearing on the emitter of transistor 132 has a positive slope which exceeds a predetermined value, the differentiated signal appearing at the output of slope detector 162 is channeled through diode 174 and diode 180 to bias transistors 182 and 184 to cutoff, thereby removing the ground from the input to transistors 138 and 154 to allow signals to pass through base clipping and pulse forming circuit 130 and 160. During switching of the direction of motion of telescope 10, switching transients may cause a signal to appear across resistor 146 unless transistors 138 and 154 are blocked. A signal is delivered from computer 80, at the time of switching of the direction of dither of telescope 10, to capacitor 166 which momentarily causes circuit 164 to keep the input to transistors 138 and 154 shorted.

With a pulse sequence of a positive pulse then a negative pulse supplied to the base of transistor 132, the pulse sequence of the rectangular pulses appearing at the output of differential amplifier 160 are such that a positive pulse then a negative pulse is applied to circuits 222 and 254 while a voltage having a sequence of a negative pulse then a positive pulse is applied to circuit 194.

The negative pulse applied to circuit 194 causes the rectangular wave generator 194 to generate a single rectangular pulse of a predetermined time duration longer than the incoming pulse.

The pulse generated by circuit 194 triggers the timing pulse generator 276 to start a pulse at the output of circuit 276 substantially coincident with the leading edge of the pulse appearing at the input circuit of the rectangular wave generator 194. The pulse at the output of circuit 194 is applied to transistor 330 of star presence pulse generator 314 to bias transistor 330 to cut-off during the period that a pulse is present at the output of circuit 194. Thus, during the period that the positive rectangular output of 194 is present, no signal can appear at the output of circuit 314. Thus, no pulse sequence of short time duration is channeled through the circuitry.

The positive pulse supplied to the input of circuit 222 triggers the monostable multivibrator therein through a differentiating network of condenser 224 and resistor 226. The positive slope at the beginning of the positive pulse activates the monostable multivibrator and the positive slope at the trailing edge of the second pulse resets it if the trailing edge of the second pulse occurs before the natural period of the monostable multivibrator has ended. The output of circuit 222 is a single pulse which has a time duration equal in length to the time between the beginning of the first pulse of the desired two pulse sequence and the end of the second pulse of the desired two pulse sequence provided that the time duration is less than the natural pulse width of the monostable multivibrator of circuit 222. The output of circuit 222 is connected through diode 318 to circuit 314 to prevent circuit 314 from producing a pulse during the period of the output pulse of circuit 222. The output of circuit 222 is also connected to diode 176 from grounding circuit 164 to hold the grounding circuit open during the existence of the pulse generated at the output of circuit 222. The output of circuit 222 is also connected to circuit 226 to control the time constant of that circuit.

It is to be noted that if the polarity sequence is wrong, i.e., a negative pulse then a positive pulse, circuit 222 will not be activated until the second pulse and will have a signal at its output at the end of the second pulse which inhibits the generation of a pulse by circuit 314.

Circuit 254 is a rectangular wave generator similar to circuit 194. It is activated on the negative pulse from the first of the two outputs of circuit 164 to generate a rectangular wave of a predetermined time duration. If the second or negative pulse does not exist or occurs at a time after the pulse generator 276 has reset, then the signal applied to diode 320 inhibits the flow of a signal through the circuit 314. If, however, the negative pulse does occur at the proper time such that the output of the circuit 254 is positive (activated), the pulse appearing at the output of pulse generator 276 generates a spike at the output of circuit 314.

The pulse generator 276 has a variable time constant in which the time constant of a multivibrator when a signal is applied to diode 292 is twice the time constant when there is no signal applied to diode 292. The time constants of the circuit are such that with the desired pulse applied to condenser 280, a rectangular pulse appears at the input to circuit 314 or condenser 316 which is rectangular and has a time duration which is equal to one-half the time between the leading edge of the first pulse of the desired sequence of pulses and the trailing edge of the second pulse of the same desired sequence of pulses, plus a predetermined time duration.

The circuit 314 generates a pulse when circuit 194 has no output, circuit 222 has no output, and circuit 254 has an output. These last mentioned control circuits prevent pulses that do not have the desired polarity sequence, the desired pulse widths, or the desired pulse separations or spacing from producing signals at the output of circuit 314.

Changes in resistance of resistors 20 and 22 generate voltages which are relatively rapidly changing and which pass through condensers 34 and 36 to appear across resistors 38 and 40 at the input to differential amplifier 42.

In filter network 44, capacitors 46 and 48 and resistors 50, 54, 56 together with transistor 52 are a high pass filter which have their resistances and capacitances adjusted to pass signals of the desired star signal frequency and above. Resistors 60, 64 and condensers 62 and 66 together with transistor 68 are a low pass filter which are adapted to pass signals which have a frequency corresponding to the desired signal to be passed and lower. Thus, circuit 44 is a band pass filter.

In the rectifier filter circuit of 100, transistor 104 amplifies the signal. The signal is coupled to diode 112 by condenser 110. Diode 112 rectifies the signal which is then filtered by the resistance-capacitance filter of resistors 120, 122 and capacitor 124. The resulting signal is then used to control the output voltage of the emitter follower transistor 106.

A particular line of selector circuit 86 is prevented from conducting by applying a negative voltage to the cathode of diode 88 or diode 90, respectively. When a negative voltage is applied to the cathode, of—for example—diode 88, the junction between diode 88 and resistor 82 is reduced to a substantially negative voltage which causes diode 92 to block the signal.

When negative voltages are applied to the cathodes of diodes 174 or 176 in the switch to ground circuit, that particular diode conducts which causes diode 180 substantially to open. When diode 180 is opened, and assuming that transistor 170 is not conducting, the negative voltage at resistor 188 is applied to the base of transistor 182 and 184 which causes them to stop conducting and to remove the ground connection from the bases of transistors 138 and 154. When a positive pulse is received at condenser 166, it is differentiated and applied to the base of transistor 170. This positive pulse causes transistor 170 to conduct momentarily and applies a voltage to the bases of transistors 182 and 184. Thus, transistors 182 and 184 are saturated and ground the inputs to transistors 138 and 154 in the base clipping circuit. When the grounding voltage is removed, however, the circuit 130 acts as a base clipper. The clipping level is determined by the bias voltage applied to the emitters of transistors 138 and 154 from circuit 100. Transistor 132 is substantially an isolation and phase inverter circuit. The base clipping action takes place at the reverse biased diodes 144 and 158. When the positive signal exceeds the reverse bias on these diodes, it is passed to the peak clipper 160.

The peak clipper 160 is a high gain differential amplifier with a nominal zero output voltage. The positive pulse on one input causes one of the differential outputs to saturate and the other to cut-off. The positive pulse on the other input causes the reverse to happen.

Circuits 194 and 254 are conventional two state single transistor circuits. The input negative rectangular pulse from the outputs of circuit 160 rapidly discharge the series R-C network through the input diode, and the transistor cuts off. This R-C network slowly charges through the potentiometer and series resistors 198 and 197; and 258 and 260 respectively. When the R-C network has charged to the preset potential, the transistor becomes saturated again. Thus, the output of each of these two circuits is a positive rectangular pulse.

The circuit 222 is triggered by a differentiating circuit of condenser 224 and resistor 226. Transistor 232 conducts only on positive triggers. The trigger is connected through diodes 228 and 236 to the collectors of monostable multivibrator whose switching elements are transistors 240 and 250. The first positive trigger activates the monostable multivibrator and if a second trigger is received before the monostable multivibrator relaxes, the second trigger returns or resets the multivibrator to its initial state.

The pulse generator 276 is a modified monostable multivibrator which includes a diode resistance network of diodes 292 and 294 and resistors 296 and 298 which modifies the time constant of the multivibrator when diode 292 conducts. Diode 292 conducts when the output from circuit 222 goes to zero, and causes the time constant of the monostable multivibrator to be twice as long as when the signal is high (stable state). If the circuit 276 is triggered by the output of the circuit of 194 through the differentiating network of condenser 280 and resistor 282, the leading edge of the star signal, and the signal at the cathode of diode 292 goes to zero at that leading edge and returns to positive at the trailing edge, then the circuit 276 resets at a time equal to one-half of the star signal width plus one-half of the time constant of the circuit when the control signal applied to the cathode of diode 292 is zero. The basic period, or long time constant, of the multivibrator 276 is designed to be longer than the time required for the image of the star to cross both surfaces 20 and 22.

The star presence pulse generator is blocked whenever a negative or zero voltage appears on the cathode of diodes 318 or 320 and when a negative voltage does not appear on the cathode of diode 334. Otherwise, if a positive voltage is applied to cathodes of diodes of 318 and 320 and a negative voltage is applied to the cathode of diode 334, the signal applied from circuit 276 is differentiated and amplified to generate a spike or pulse at the output terminal of circuit 314.

Thus, the device of this invention is typical electronic circuitry which is adapted to generate a signal which is an indication of the presence of a star on the focal plane of a dithered telescope having photosensitive resistors arranged as described above, in which the time of occurence of the pulse at the output of the circuit of this invention relative to the position of the optical axis of the telescope at that time is a measure of the off-set of the star image from a predetermined offset.

Although the device of this invention has been described in detail above it is not intended that the invention should be limited by that description but only in accordance with the spirit and scope of the following claims:

I claim:
1. An electronic circuit for generating a spike voltage indicating the presence of a pair of signal pulses of predetermined polarity sequence, minimum slope, minimum pulse width, and maximum pulse width comprising:
  a first rectangular wave generator adapted to generate a first singular rectangular pulse of a first predetermined time duration when a negative signal is applied to its input terminals;
  a second rectangular wave generator responsive to input signals of positive slope, adapted to generate as an output signal a second single rectangular pulse of a second predetermined time duration and to extinguish its output signal when a positive slope signal is applied to its input terminals during said predetermined time duration;
  a third rectangular wave generator connected to receive the output signal of said first generator and said second generator, adapted to generate a third single rectangular pulse equal in length to said second pulse plus a predetermined time period;
  a fourth rectangular wave generator adapted to generate a fourth single rectangular pulse of a fourth predetermined time duration when a negative signal is applied to its input terminals;
  signal receiving terminals;
  signal inverting means, connected to receive signals from said receiving terminals and to deliver an inverted signal to the input of said first generator;
  the input terminals of said second and fourth wave generators being connected to said receiving terminals;
  spike voltage generating means connected to the output terminals of said third wave generator to generate a spike at the occurrence of the trailing edge of the output signal of said third generator; and
  means connected to the outputs of said first, second and fourth wave generators for inhibiting the generation of a spike by said spike voltage generating means when said first generator has an output signal, or when said second generator has on output signal, or when said fourth generator has no output signal.
2. A device as recited in claim 1 and further comprising:
  means for peak clipping a signal, connected by its output terminals to said receiving terminals;
  means for base clipping a signal, connected by its output terminals to said means for peak clipping;
  a grounding circuit connected to said means for base clipping to inhibit the flow of signals through said means for base clipping;

a slope detector connected by its input terminals to the input of said means for base clipping and by its output terminals to said grounding circuit to remove the inhibiting signal from said grounding circuit to said means for base clipping when the slope of the signal detected by said slope detector exceeds a predetermined minimum value;

said grounding circuit being connected to the output of said second generator to remove the grounding signal from said means for base clipping when said second generator has an output signal.

3. A device as recited in claim 2 in which said signal inverting means and said means for peak clipping is a saturated differential amplifier, and said first generator is connected to the inverted output of said amplifier and said second and fourth generators are connected to the direct output of said amplifier.

4. A device as recited in claim 3 and further comprising:
a band pass filter, connected by its output terminals to the input terminals of the said means for base cliping;
means for converting a first signal into a second signal which is a measure of the root mean square value of said first signal, connected by its output terminals to control the base clipping level of said means for base clipping and connected by its input terminals to the input terminals of said band pass filter.

5. A device as recited in claim 4 and further comprising:
an electrical means connected between said band pass filter and said base clipper for generating two signals of opposite polarity and for selectively blocking one of said signals and passing the other of said signals.

6. An electronic circuit for generating a spike indicating the presence of a pair of signal pulses of predetermined polarity sequence, minimum slope, minimum pulse width, and maximum pulse width comprising:
a first rectangular wave generator adapted to generate a first single rectangular pulse of a first predetermined time duration when a signal of a first polarity is applied to its input terminals;
a second rectangular wave generator responsive to input signals of a first slope polarity, adapted to generate as an output signal a second single rectangular pulse of a second predetermined time duration and to extinguish its output signal when a signal of said first slope polarity is applied to its input terminals during said predetermined time duration;
a third rectangular wave generator connected to receive the output signal of said first generator and said second generator and adapted to generate a third single rectangular pulse equal in length to said second pulse plus a predetermined time period;
a fourth rectangular wave generator adapted to generate a fourth single rectangular pulse of a fourth predetermined time duration when a signal of said first polarity is applied to its input terminals;
means for delivering an inverted signal to the input terminals of said first wave generator, and a direct signal to the input terminals of said second and fourth wave generators;
spike voltage generator means connected to the output terminal of said third wave generator to generate a spike at the occurrence of the trailing edge of the output signal of said third wave generator; and
means connected to the outputs of said first, second and fourth wave generators for inhibiting the generation of a spike by said spike voltage generating means when said first generator has an output signal, or said second generator has an output signal, or said fourth generator has no output signal.

7. A device as recited in claim 6 in which said means for delivering signals is a saturating differential amplifier adapted to peak clip its input signals and further comprising:
means for base clipping a signal, connected by its output terminals to the input terminals of said differential amplifier;
a grounding circuit connected to said means for base clipping to inhibit the flow of signals through said means for base clipping;
a slope detector connected by its input terminals to the input of said means for base clipping and by its output terminals to said grounding circuit to remove the inhibiting signal from said grounding circuit to said means for base clipping when the slope of the signal detected by said slope detector exceeds a predetermined minimum value;
said grounding circuit being connected to the output of said second generator to remove the grounding signal from said means for base clipping when said second generator has an output signal.

8. A device as recited in claim 7 and further comprising:
a band pass filter, connected by its output terminals to the input terminals of the said means for base clipping;
means for converting a first signal into a second signal which is a measure of the root mean square value of said first signal, connected by its output terminals to control the base clipping level of said means for base clipping and connected by its input terminals to the input terminals of said band pass filter.

9. A device as recited in claim 8 and further comprising:
an electrical means connected between said band pass filter and said base clipper for generating two signals of opposite polarity and for selectively blocking one of said signals and passing the other of said signals.

References Cited by the Examiner

UNITED STATES PATENTS

| 2,421,138 | 5/1947 | Wheeler | |
| 2,489,297 | 11/1949 | Laben et al. | 328—109 |
| 2,561,772 | 7/1951 | Atwood | 328—114 |
| 3,095,541 | 6/1963 | Ashcraft | 328—115 |
| 3,182,206 | 5/1965 | Waters | 328—115 |

ARTHUR GAUSS, *Primary Examiner.*

B. P. DAVIS, *Assistant Examiner.*